(12) United States Patent
Mesmakhosroshahi

(10) Patent No.: US 10,762,377 B2
(45) Date of Patent: Sep. 1, 2020

(54) FLOATING FORM PROCESSING BASED ON TOPOLOGICAL STRUCTURES OF DOCUMENTS

(71) Applicant: KONICA MINOLTA LABORATORY U.S.A., INC., San Mateo, CA (US)

(72) Inventor: Maral Mesmakhosroshahi, Foster City, CA (US)

(73) Assignee: KONICA MINOLTA LABORATORY U.S.A., INC., San Mateo, CA (US)

(*) Notice: Subject to any disclaimer, the term of this patent is extended or adjusted under 35 U.S.C. 154(b) by 62 days.

(21) Appl. No.: 16/236,498

(22) Filed: Dec. 29, 2018

(65) Prior Publication Data
US 2020/0210746 A1 Jul. 2, 2020

(51) Int. Cl.
*G06K 9/00* (2006.01)
*G06K 9/46* (2006.01)

(52) U.S. Cl.
CPC .......... *G06K 9/46* (2013.01); *G06K 9/00456* (2013.01); *G06K 2209/01* (2013.01)

(58) Field of Classification Search
CPC ... G06K 9/46; G06K 9/00456; G06K 2209/01
See application file for complete search history.

(56) References Cited

U.S. PATENT DOCUMENTS

| | | | | |
|---|---|---|---|---|
| 2007/0168382 A1* | 7/2007 | Tillberg | ............. | G06K 9/00449 |
| 2015/0199400 A1* | 7/2015 | Wu | ....................... | G06F 40/211 |
| | | | | 434/353 |
| 2016/0379184 A1* | 12/2016 | Smith | ................ | G06Q 20/042 |
| | | | | 705/14.23 |
| 2020/0050845 A1* | 2/2020 | Foncubierta Rodriguez | ............. | |
| | | | | G06K 9/00463 |
| 2020/0097714 A1* | 3/2020 | Moghtadai | ........ | G06Q 30/0206 |

OTHER PUBLICATIONS

Belaïd et al., "Administrative Document Analysis and Structure", in "Learning Structure and Schemas from Documents", pp. 51-71, 2011, Springer-Verlag Berlin Heidelberg.
Oliveira et al., "Fast CNN-Based Document Layout Analysis", IEEE International Conference on Computer Vision Workshops (ICCVW), pp. 1173-1180, 2017.
Gupta et al., "Document Layout Analysis and Classification and Its Application in OCR", 10th IEEE International Enterprise Distributed Object Computing Conference Workshops (EDOCW'06), 2006.

* cited by examiner

*Primary Examiner* — Xin Jia
(74) *Attorney, Agent, or Firm* — Chen Yoshimura LLP

(57) ABSTRACT

A method processes scanned floating forms by comparing topological structures of an empty form and a corresponding filled form. The topological structure of each form includes vertical and horizontal ordered sequences of text phrases in the form, which describe directional relationships among text phrases but not their distances. A partial structure alignment method is used in the comparison, where insertions of text in the topological structure of the filled form relative to that of the empty form is not penalized, but deletions and substitutions are penalized. Based on this comparison, some text phrases in the filled form are matched to the those in the empty form, and unmatched text in the filled form is deemed user-filled data. The method further associates user-filled data with fields of the form based on a settings file of the empty form.

20 Claims, 6 Drawing Sheets

|           | From:     |          |      |       |
|-----------|-----------|----------|------|-------|
| To:       | Invoice:  |          |      |       |
|           | Date:     |          |      |       |
|           | Period:   |          |      |       |
|           | Due:      |          |      |       |

| Services | Date | Quantity | Rate | Total |
|----------|------|----------|------|-------|
|          |      |          |      |       |
|          |      |          |      |       |
| Total    |      |          |      |       |

Fig. 2A

From:
Quality Printing
123 Broadway
Anytown, NY 12345
(456) 555-1234
qualityprinting@mail.com To:
ABC Inc.
789 Main St.
Anytown, NY 12346
(456) 555-5678

Invoice: 1234
Date: Dec. 1, 2018
Period: Nov. 2018
Due: Dec. 15, 2018

| Services | Date | Quantity | Rate | Total |
|----------|------|----------|------|-------|
| Copies | xx-xx-xxxx | xxxx | xxx | xxx |
| Poster prints | xx-xx-xxxx | xxx | xxx | xxx |
| Presentation Binders | xx-xx-xxxx | xx | xxx | xxx |
| Copies | xx-xx-xxxx | xxx | xxx | xxx |
| Poster prints | xx-xx-xxxx | xx | xxx | xxx |
| Total |  |  |  | xxxx |

Fig. 2B

|          |       |           |        |       |
|----------|-------|-----------|--------|-------|
| Services | Date  | Quantity  | Rate   | Total |
|          |       |           |        |       |
|          |       |           |        |       |
| Total    |       |           |        |       |

From:
To:
Invoice:
Date:
Period:
Due:

Fig. 3A

From:
Quality Printing
123 Broadway
Anytown, NY 12345
(456) 555-1234
qualityprinting@mail.com To:
ABC Inc.
789 Main St.
Anytown, NY 12346
(456) 555-5678

Invoice: 1234
Date: Dec. 1, 2018
Period: Nov. 2018
Due: Dec. 15, 2018

| Services | Date | Quantity | Rate | Total |
|---|---|---|---|---|
| Copies | xx-xx-xxxx | xxxx | xxx | xxx |
| Poster prints | xx-xx-xxxx | xxx | xxx | xxx |
| Presentation Binders | xx-xx-xxxx | xx | xxx | xxx |
| Copies | xx-xx-xxxx | xxx | xxx | xxx |
| Poster prints | xx-xx-xxxx | xx | xxx | xxx |
| Total | | | | xxxx |

|  | Services | Date | Quantity | Rate | Total |
|---|---|---|---|---|---|
|  |  |  |  |  |  |
|  |  |  |  |  |  |
|  | Total |  |  |  |  |

From:
Quality Printing
123 Broadway
Anytown, NY 12345
(456) 555-1234
qualityprinting@mail.com To:
ABC Inc.
789 Main St.
Anytown, NY 12346
(456) 555-5678

Invoice: 1234
Date: Dec. 1, 2018
Period: Nov. 2018
Due: Dec. 15, 2018

| Services | Date | Quantity | Rate | Total |
|---|---|---|---|---|
| Copies | xx-xx-xxxx | xxxx | xxx | xxx |
| Poster prints | xx-xx-xxxx | xxx | xxx | xxx |
| Presentation Binders | xx-xx-xxxx | xx | xxx | xxx |
| Copies | xx-xx-xxxx | xxx | xxx | xxx |
| Poster prints | xx-xx-xxxx | xx | xxx | xxx |
| Total |  |  |  | xxxx |

Fig. 4B

FLOATING FORM PROCESSING BASED ON TOPOLOGICAL STRUCTURES OF DOCUMENTS

BACKGROUND OF THE INVENTION

Field of the Invention

This invention relates to a method for processing a document to extract data that has been filled into a form by a user, and in particular, it relates to method for extracting user-filled data in a form that has a floating structure.

Description of Related Art

In digital form processing, a main challenge is finding the user-filled data in the document image. The document being processed is an image that contains the content of the form and user-filled data but does not contain tagged information regarding the definition and locations of the form fields. Depending on the form structure, different approaches are needed to process such forms. When the form structure is fixed, i.e., the locations and sizes of the user input areas for the fields are all fixed, conventional image processing algorithms can easily extract the user-filled data by aligning the image of a filled form with an image of an empty version of the form and calculating the difference between the empty and filled forms.

Some forms are semi-structured (also referred to as floating forms), where, for example, the size of the user input areas can be expanded horizontally or vertically, or rows and/or columns can be added to or deleted from a table structure, etc. For semi-structured forms, some processing methods require certain constraints in order to process them. For example, some methods require a fixed table format (fixed number and locations of table cells), or require a portion of the form to be fixed so that they can align the empty and fixed forms based on those parts. Processing floating forms remain a challenging problem because the empty and filled forms do not exactly match with each other.

SUMMARY

Accordingly, the present invention is directed to a floating form processing method that substantially obviates one or more of the problems due to limitations and disadvantages of the related art.

Embodiments of the present invention provides a method for floating (semi-structured) form processing by matching the topological structures extracted from the empty and filled forms and extracting the form fields and user-filled data from the filled form.

An object of the present invention is to provide a method that can process floating forms without major constraints.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve the above objects, the present invention provides a computer-implemented method for processing a document image, which is an image of a filled form that corresponds to an empty form, the empty form having a plurality of form fields in a floating structure, the method including: obtaining a topological structure of the empty form, which includes, for each given text phrase among at least a subset of text phrases of the empty form, a vertical sequence containing text phrases in the empty form that have a vertically aligned relationship with the given text phrase, and a horizontal sequence containing text phrases in the empty form that have a horizontally aligned relationship with the given text phrase; obtaining a settings file for the empty form, which specifies text phrases of the empty form that are field names of form fields of the empty form, and for each form field, a positional relationship between the field name and a corresponding user input area; extracting and segmenting text phrases from the image of the filled form; based on the extracted and segmented text phrases, generating a topological structure of the filled form, which includes, for each given text phrase among at least a subset of text phrases in the filled form, a vertical sequence containing text phrases in the filled form that have a vertically aligned relationship with the given text phrase, and a horizontal sequence containing text phrases in the filled form that have a horizontally aligned relationship with the given text phrase; matching the text phrases in the empty form with segmented text phrases in the filled form by comparing the topological structure of the empty form with the topological structure of the filled form; based on the matching of the text phrases, extracting text phrases in the filled form that do not match any text phrases in the empty form as user-filled data; and associating each text phrases of the user-filled data of the filled form with a form field based on the settings file and positional relationship of the text phrase of user-filled data with text phrases in the filled form that match field names in the empty form.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

BRIEF DESCRIPTION OF THE DRAWINGS

FIGS. 2A and 2B show examples of an empty form which has a floating structure, and a corresponding filled form, respectively.

FIGS. 3A and 3B show examples of the empty form and corresponding filled form of FIGS. 2A and 2B, respectively, schematically illustrating the bounding boxes of some segmented text phrases.

FIGS. 4A and 4B show examples of the empty form and corresponding filled form of FIGS. 3A and 3B, respectively, where the bounding boxes of field names within the table structure have been expanded horizontally.

DETAILED DESCRIPTION OF PREFERRED EMBODIMENTS

Embodiments of the present invention provide a method for extracting user-filled data in semi-structured (also referred to as "floating") forms. A form typically includes fixed text and multiple fields, each field including a field name, i.e. the text in the empty form that acts as a "prompt" for the user, and a user input area where the user can fill in data. A form may also include tables, which typically includes a header row, and sometimes a header column (e.g. the leftmost column), that contain text that act as field names, and table cells that act as user input areas. In a floating form, the sizes of at least some of the user input areas are not fixed, but can vary horizontally or vertically depending on the amount of data the user fills in. In addition, a semi-structured form may contain tables where column widths and/or row heights may vary, and/or where rows and/or columns may be inserted into or deleted from the table structure. FIG. 2A shows an example of an empty form, and FIG. 2B shows an example of a corresponding filled form (i.e. a filled version of the same form). As can be seen, the vertical size of the "From:" field changed after the user filled in data, so the "To:" and "Invoice:" fields are moved downwards in the filled form; the number of rows in the table is also increased in the filled form.

The floating form processing method described here can process floating scanned forms using the topological information in the forms, by performing partial structure alignment to extract user's data and associate it with the form fields.

Figure 1:
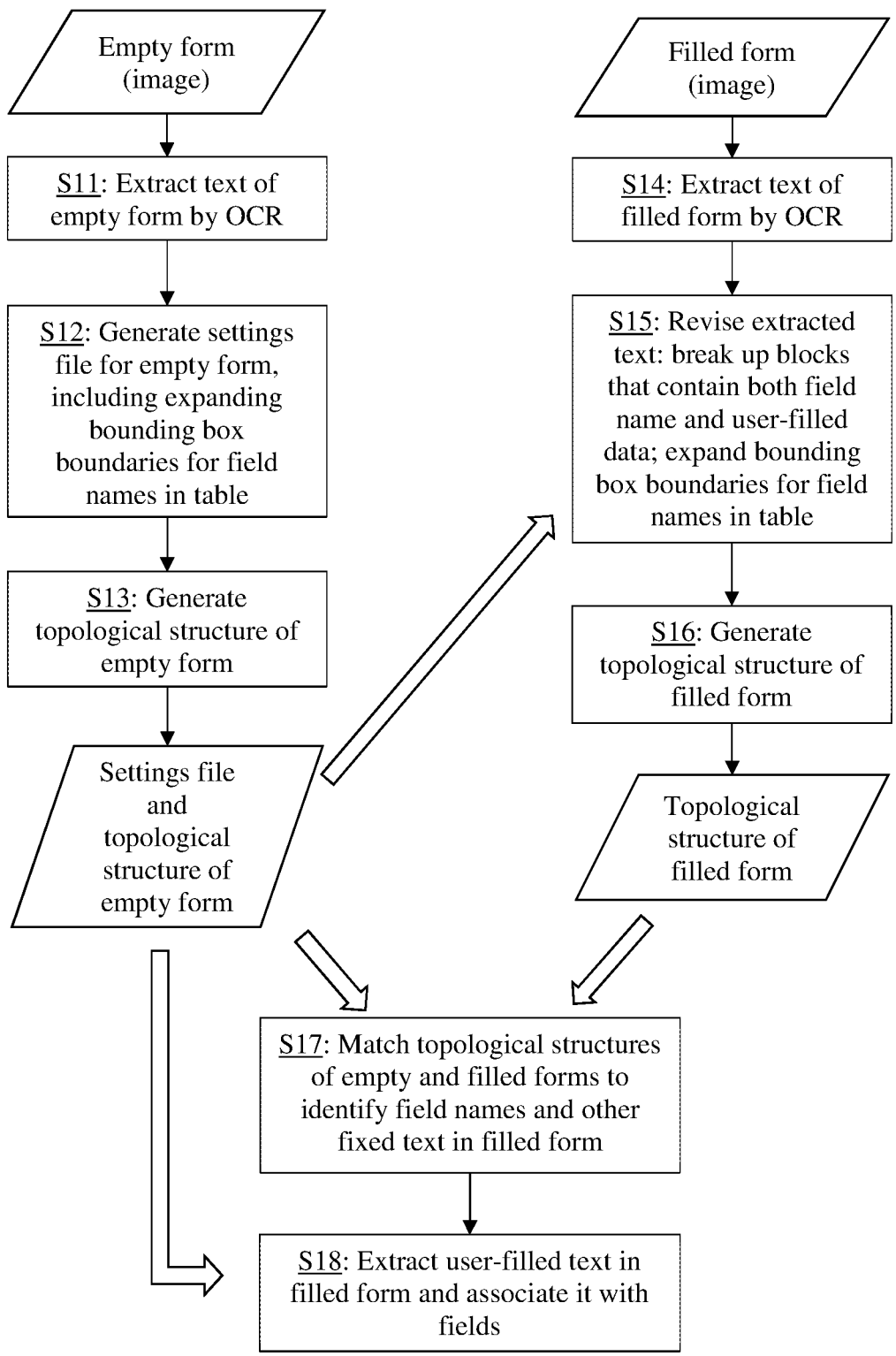
FIG. 1 schematically illustrates a floating form processing method according to an embodiment of the present invention.

FIG. 1 is a flowchart that schematically illustrates a process of processing a floating form to extract user-filled data according to an embodiment of the present invention. The general flow of the process is described first, followed by more detailed descriptions of each step.

The input to the process includes an image of an empty form and an image of a corresponding filled form. The image of the empty form is processed by OCR (optical character recognition) to extract and segment the text in the image (step S11). This step may be omitted or simplified when a text-based version of the empty form is available. The segmented text of the empty form is processed based on input from an operator who has prior knowledge regarding the fields in the empty form, to generate a settings file (step S12). The settings file specifies which text phrase of the empty form is a field name of a field, and for each field, the positional relationship between the field name and the corresponding user input area. Step S12 also modifies some of the field names based on operator input. The segmented text of the empty form, after the modification in step S12, is processed to generate a topological structure of the empty form (step S13). Steps S11, S12 and S13 are performed on the empty form once to generate the settings file and topological structure for the empty form, which can then be stored in a database and used repeatedly to process multiple filled forms corresponding to the same empty form.

The image of the filled form is processed by OCR to extract and segment the text in the image (step S14). Post-processing is performed to modify some of the segmented text based on information in the settings file (step S15). The segmented text of the filled form, after the modification in step S15, is processed to generate a topological structure of the filled form (step S16). The topological structure of the filled form and the topological structure of the empty form are compared and matched using a partial alignment method, to identify text that is present in both the empty form and the filled form in a corresponding relationship (step S17). Based on the matching, the user-filled data in the filled form is extracted and then associated with the field names (step S18).

The process is implemented in a computer system which includes a processor that can execute computer-readable program code stored in a non-volatile memory. The computer system may also include user interface devices such as monitor, keyboard, mouse, etc. to interact with an operate and obtain input from the operator in some of the steps. Unless otherwise specified, the various steps may be performed automatically without operator intervention.

The steps are explained in further details below.

Steps S11 and S14: Any suitable OCR method may be used to extract the text from the image of the empty form and the image of the filled form. Optionally, pre-processing may be performed to remove any table lines, graphics and images, as well as noises. In some embodiments, text extraction includes block and line segmentation, and the segmented lines are then passed to a recognition engine, which may be based on artificial neural networks such as a LSTM (long short term memory) network to extract the text in each line. Text blocks that are on the same line but separate from each other are further segmented into phrases. For each text phrase, a bounding box is generated, which is the smallest rectangular box that completely contains the text phrase. FIGS. 3A and 3B show the examples of the empty and filled forms of FIGS. 2A and 2B, with some of the bounding boxes drawn for purpose of illustration (these boxes are not drawn precisely in the figures).

As used in this disclosure, a "text phrase" is a set of one or more text words that are located on the same line and in close proximity of each other, i.e., the spaces between words within a phrase are less than a predetermined threshold, such as a predefined multiple of the mean character width in the image, a predefined multiple of the mean character spacing in the image, a predefined multiple of the mean word spacing in the image, or some other appropriate threshold value. Thus, for example, in the examples of FIGS. 3A and 3B, the text in the same row but different columns of the table are segmented into different phrases, and separate bounding boxes are generated for them.

It should be noted that the OCR step S11 may be simplified when an electronic version of the empty form is available as an input, where the electronic version contains the text and specifies the formatting (e.g. location of the text, etc.) of the empty form.

Step S12: This step generates a settings file for the empty form based on prior knowledge regarding field names and positions of user input areas in the empty form. The settings file contains descriptions of the fields of the empty form, including, for each field: the position of the field name, the text of the field name, and the positional relationship between the field name and the associated user input area, e.g., whether the user input area is located to the right of the field name, or below the field name, etc. For example, for table fields, the user input areas are typically below the header row; for some fields, the user input areas are on the same line to the right of the field names; for some fields, the use input areas are located both to the right and below the field names, etc.

In some embodiments, this step is performed in a manual or semi-automatic manner, requiring input from an operator who is assumed to have prior knowledge regarding the above information of the empty form. More specifically, the computer program implements a GUI (graphical user interface) that displays the extracted text of the empty form along with the bounding boxes for each text phrase. Using GUI tools, the operator identifies a bounding box, indicates that the phrase is a field name, and specifies the positional relationship between the field name and the associated user input area (to the right, below, etc.). The computer program stores the above information, along with the text and position of the bounding box, in the settings file.

In this step, using GUI tools, the operator also instructs the program to expand the bounding box horizontally for each field name that is within a table, so that the bounding box has approximately the same boundaries in the horizontal direction as the corresponding column of the table. For example, the GUI may allow the operator to drag the bounding box boundaries. An example is shown in FIG. 4A, where the bounding boxes for the phrases "Services", "Total", "Date", etc., have been expanded to the corresponding column boundaries. The settings file stores flags that identify these field names, as well as both their original bounding box and expanded bounding box boundaries.

In some other embodiments, step S12 may be completely automated (requiring no operator input) when the input file is an electronic version of the empty form that contains metadata such as tags to define the form structure including all information required for the settings file. In such a case, the program will analyze the input electronic file to generate the settings file.

Step S15: For the filled form, after text extraction and segmentation, post-processing is automatically performed to modify the segmented text in two ways.

The first modification is to break up any segmented phrase that contains both a field name and associated user-filled data into multiple phrases, including one phrase containing only the field name and one or more phrases containing user-filled data. This is because in the filled form, for some fields, the text of the field name and the text of the associated user-filled data may be located sufficiently close to each other and be segmented into the same phrase in the text segmentation and extraction step S14. For example, in the example shown in FIG. 3B, the word "Invoice:" and the invoice number located to its right are likely to be segmented as one phrase by the segmentation algorithm of step S14, and need to be broken up into two phrases. To accomplish this, the text of each phrase in the filled form, as segmented in step S14, is compared to all field names in the empty form. This comparison uses information in the settings file of the empty form. When a part of a phrase in the filled form matches a field name, the phrase is broken up into two or more segments, so that one resulting segment contains only the matched part (the field name), and the remaining parts form one or more new phrases. Some examples of broken up text are shown in FIG. 4B.

The second modification step is to expand the bounding boxes horizontally for field names within tables. To accomplish this, the text of each phrase in the filled form, as extracted in step S14, is compared to all field names in the empty form that are flagged as having horizontally expanded bounding boxes. This comparison again uses information in the settings file, in which field names that have expanded bounding boxes are flagged. When a phrase in the filled form matches a flagged field name in the settings file, the bounding box of the phrase in the filled form is expanded horizontally by amounts proportional to the amounts that the corresponding bounding box in the empty form was expanded. More specifically, if the corresponding bounding box in the empty form was expanded to the left and to the right respectively by XL and XR times the original bounding box width, the bounding box in the filled form will be expanded to the left and right by XL and XR times its original width. These ratios can be calculated from the data stored in the settings file, e.g., both the original and the expanded bounding box locations for the flagged field name. Some examples of the result of the expansion is shown in FIG. 4B. The purpose of expanding the bounding boxes for field names in tables (e.g. header rows) is to ensure that, in subsequent processing, any text that belongs to a table column will be correctly recognized as such regardless of the actual horizontal location of the text within the column.

In some embodiments, the steps of expanding the bounding box boundaries in step S12 and step S15 may be omitted.

Steps S13 and S16: These steps are respectively performed on the empty and filled forms, after text segmentation steps (steps S11 and S14) and modification steps (steps S12 and S15), to generate respective topological structures of the forms based on topological information of the segmented text phrases in each form. The topological information for each form includes information about the vertically and horizontally aligned relationships of text phrase bounding boxes in that form. Taking the empty form as an example, step S13 is performed as follows.

For each segmented text phrase in the empty form, a search is performed in the same form to identify all other phrases whose bounding boxes have a vertically aligned relationship with the bounding box of the subject phrase. A vertical sequence of phrases is generated which contains the subject phrase and all (if any) of the vertically aligned phrases, in an order according to their vertical positions. Visually, these bounding boxes form a vertical string. Similarly, another search is performed in the same form to identify all other phrases whose bounding boxes have a horizontally aligned relationship with the bounding box of the subject phrase. A horizontal sequence of phrases is generated which contains the subject phrase and all (if any) of the horizontally aligned phrases, in an order according to their horizontal positions. Visually, these bounding boxes form a horizontal string. As a result, for each text phrase in the empty form, two associated sequences are generated. All sequences associated with all text phrases of the empty form collectively constitute the topological structure of the empty form.

Here, two bounding boxes are deemed to have a vertically (or horizontally) aligned relationship if their vertical projections onto the horizontal (or vertical) axis overlap each other. Alternative definitions of the aligned relationship may be used, for example: two bounding boxes are deemed to have a vertically aligned relationship if their vertical projections onto the horizontal axis overlap each other for an amount greater than a predefined threshold. The predefined threshold may be defined as a multiple of the mean character width, or a percentage of the widths of one or both of the bounding boxes involved, etc. In another alternative, two bounding boxes are deemed to have a vertically aligned relationship if their vertical projections onto the horizontal axis do not overlap each other but are separated by an amount less than a predefined threshold. The predefined threshold may be defined as a multiple of the mean character width, or a percentage of the widths of one or both of the bounding boxes involved, etc. Similar alternative definitions may be applied to the horizontal direction.

Step S16 is similar to step S13. For each text phrase in the filled form, two associated sequences are generated. All sequences associated with all text phrases of the filled form collectively constitute the topological structure of the filled form. It is noted that while the algorithm of generating the topological structure is identical for the empty form and the filled form, the resulting topological structure for the filled form will likely have more sequences and longer sequences.

Figure 5A:
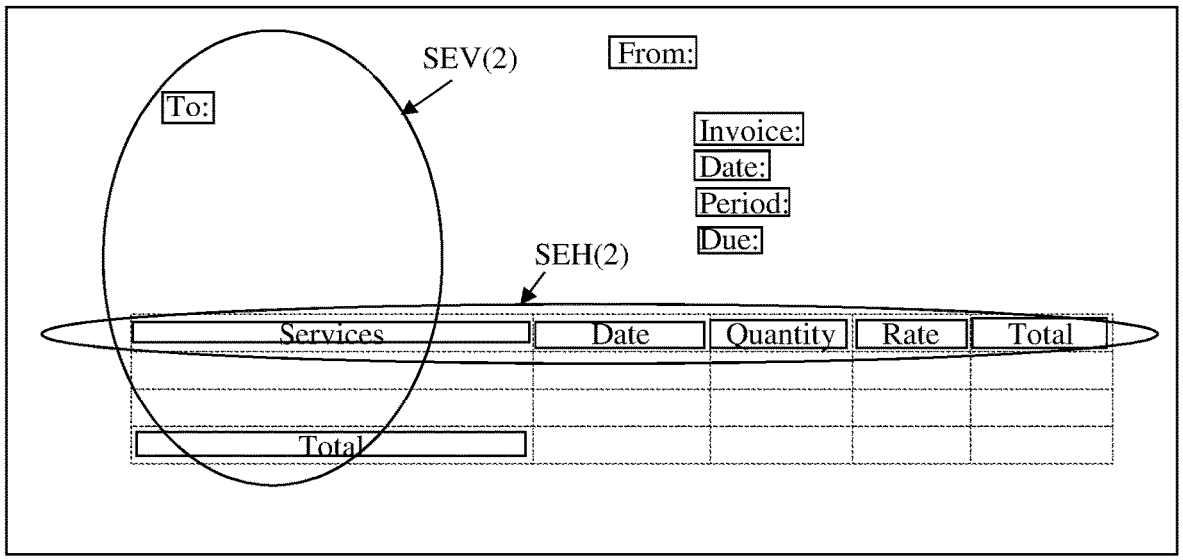
FIGS. 5A and 5B show examples of the empty form and corresponding filled form of FIGS. 4A and 4B, respectively, illustrating some of the vertical and horizontal sequences formed as a part of their topological structures.
Figure 5B:
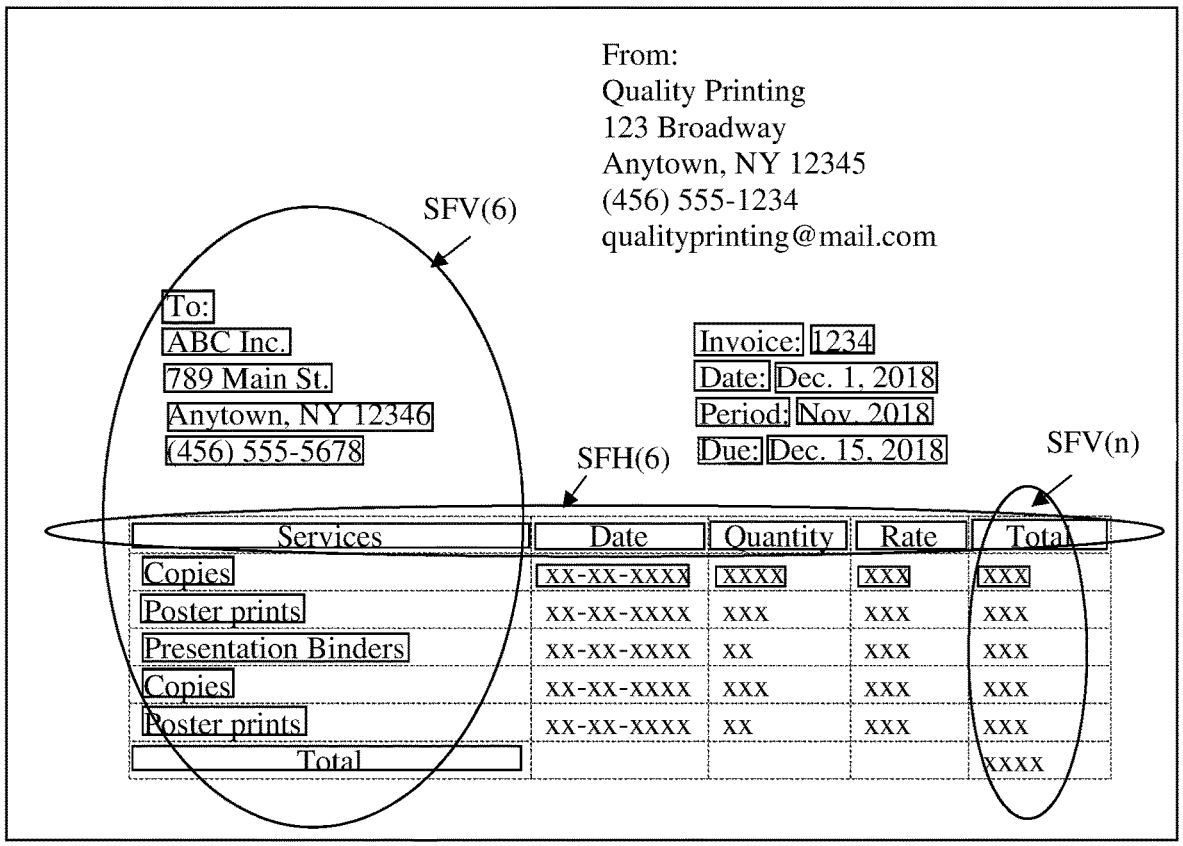

FIGS. 5A and 5B show examples of the empty and filled forms, respectively, where two (vertical and horizontal) strings of bounding boxes are indicated (by the two ovals) for the phrase "Services" in the table. In the empty form, the vertical sequence is:
SEV(2)={"To:", "Services", "Total"}
and the horizontal sequence is:
SEH(2)={"Services", "Date", "Quantity", "Rate", "Total"}
In the filled form, the vertical sequence is:
SFV(6)={"To:", "ABC Inc.", "789 Main St.", "Anytown, NY 12346", "(456)555-5678",
"Services", "Copies", "Poster prints", "Presentation binders", "Copies", "Poster prints", "Total"} and the horizontal sequence is:
SFH(6)={"Services", "Date", "Quantity", "Rate", "Total"}

In the above notations for the sequences, the number in the parentheses is an identifier of the text phrase within the empty or filled form, "E" and "F" denote "empty form" and "filled form", and "V" and "H" denote "vertical" and "horizontal", respectively.

Note that because steps S13 and S16 are performed after steps S12 and S15, the bounding boxes of field names in the table of the empty form, and the bounding boxes of the corresponding text phrases in the filled form, have been expanded horizontally. Therefore, for example, in the filled form, the bounding box for "Services" (having been expanded) overlaps horizontally with the bounding box of "Copies" below it, even though their original bounding boxes would not have overlapped (see FIG. 3B). As a result of expanding these bounding boxes, in the filled form, all the phrases in the leftmost column of the table are captured in the vertical sequence for "Services".

Step S17: In this step, the topological structure of the empty form generated in step S13 and the topological structure of the filled form generated in step S16 are compared and matched to identify text phrases in the filled form that correspond to text phrases in the empty form. This is based on the assumption that each phrase in the empty form is present somewhere in the filled form, and that the topology of the phrases in the empty form should be similar to that of the corresponding phrases in the filled form, even though the fill form will contain many more phrases. Here, topology generally refers to the directional relationships among phrases but not their distances. For example, if in the empty form one phrase is below another phrase, then the two corresponding phrases in the filled form would be expected to have the same directional relationship even though the distance between them may be different in the filled form than in the empty form.

Figure 1A:
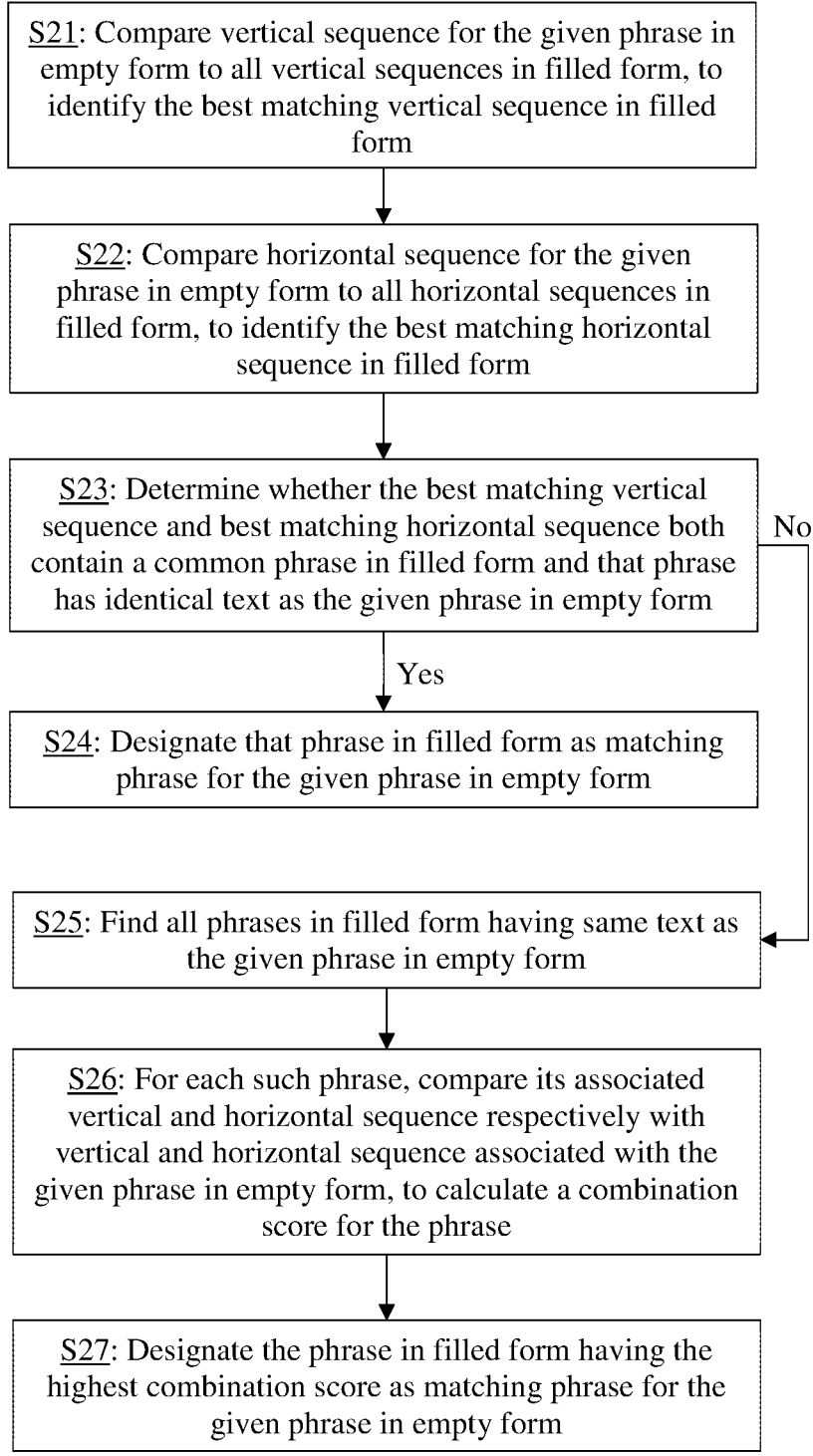
FIG. 1A schematically illustrates a topological structure matching process in the floating form processing method of FIG. 1.

More specifically, the matching step S17 includes the following (see FIG. 1A).

For each given phrase in the empty form, its vertical sequence is compared to all vertical sequences in the filled form, and the best matching one is identified (step S21). Similarly, the horizontal sequence of the given phrase in the empty form is compared to all horizontal sequences in the filled form, and the best matching one is identified (step S22). A partial sequence alignment method is employed to match two sequences.

In a partial alignment of two sequences, $S_1=(s_{11}, s_{12}, \ldots, s_{1n})$ and $S_2=(s_{21}, s_{22}, \ldots, s_{2m})$, the two sequences are compared element by element; the elements in the two sequences that match each other in the same order are identified as matching elements (referred to as an aligned partial sequence), and a penalty is set for each insertion, deletion or substitution of element in the second sequence relative to the first sequence. For example, for two sequences $S_1$="ABC" and $S2$="AC", the aligned partial sequence is "AC" and there is a deletion of element "B". For $S_1$="ABC" and $S_2$="ABDC", the aligned partial sequence is "ABC" and there is insertion of element "D". For $S_1$="ABC" and $S_2$="ADC", the aligned partial sequence is "AC" and there is a substitution of element "B" by element "D".

In one embodiment, a score is assigned to the partial alignment of two sequences based on the number of insertions, substitutions and deletions between the two sequences. If a sequence $S_1$ in the empty form is compared a sequence $S_2$ in the filled form, each insertion in the filled form sequence $S_2$ is given a penalty of 0, because sequences in the filled form are expected to have insertions that represent user-filled data; each deletion is given a penalty, such as 3, and each substitution is given another penalty, such as 5, and the penalties are summed to give the score. In some embodiments, a reward (negative point) may be given based on the number of matching elements between the two sequences. Using this algorithm, the lowest score indicates the best match.

For example (see FIGS. 5A and 5B), the score for the partial sequence alignment of SEV(2) in the empty form and SFV(6) in the filled form example will be 0; the score for the partial sequence alignment of SEV(2) in the empty form and the vertical sequence SFV(n) in the filled form, which corresponds to the rightmost column of the table (containing the phrase "Total"), will be 2×3=6 since it indicates deletions or substitutions of the phrases "To:" and "Services". The score of the partial sequence alignment of SEV(2) in the empty form and most other vertical sequence in the filled form will be 3×3=9 since all three elements in SEV(2) will be deemed deleted or substituted. Similarly, the score for the partial sequence alignment of SEH(2) in the empty form and SFH(6) in the filled form will be 0; the score for the partial sequence alignment of SEH(2) in the empty form and most other horizontal sequence in the filled form will be high.

Then, for the given phrase in the empty form, the best matching vertical sequence and the best matching horizontal sequence are examined to determine whether they both contain a common phrase in the filled form and that phrase has identical text as the given phrase in the empty form (step S23). For example, the best matching sequences SFV(6) and SFH(6) both contain the phrase "Services" in the filled form and the text of this phrase is identical to the text of the given phrase in the empty form. Visually, this means that the best matching vertical sequence and the best matching horizontal sequence intersect each other, and the intersection is a phrase that has identical text as the give phrase in the empty form. If the determination is affirmative ("Yes" in step S23), that phrase in the filled form is designated as the matching phrase for the given phrase in the empty form (step S24).

Note that both the empty form and the filled form may contain multiple text phrases that are identical textually but are different occurrences, such as the phrase "Total" which occurs twice in the empty form and twice in the filled form. The different occurrences are separately identified as different phrases in the text segmentation step. In step S23, "a common phrase in the filled form" refers to the same occurrence of the phrase (i.e. a phrase with the same identifier) in the filled form, and does not include two different phrases that happen to be textually identical. Thus, if the best matching vertical sequence contains one occurrence of a phrase and the best matching horizontal sequence contains a different occurrence of the phrase (which are textually identical), the determination in step S23 will not be affirmative. Sometimes, the best matching vertical sequence and the best matching horizontal sequence do not contain a common phrase in the filled form having identical text as the given phrase in the empty form. This may be due to "accidental" similarities in the two forms. In case of such a negative determination ("No" in step S23), a combination score is calculated to find the best possible matching phrase in the filled form.

First, find all phrases in the filled form that have the same text as the given phrase in the empty form (step S25). For each such phrase in the filled form, its associated vertical and horizontal sequences are compared respectively to the vertical and horizontal sequences associated with the given phrase in the empty form, using partial alignment (step S26). The matching elements in each pair of sequences are identified. A combination score for this phrase in the filled form is calculated based on the number of correct matches in both directions relative to the total number of sequence elements in both directions (step S26). In one embodiment, the combination is defined as:

$$\frac{(\text{\# of matches in vertical sequences}) + (\text{\# of matches in horizontal sequences})}{(\text{total \# of elements in vertical sequences}) + (\text{total \# of elements in horizontal sequences})}$$

The phrases in the filled form that has the highest combination score is designated as the matching phrase for the given phrase in the empty form (step S27).

Note that, in step S15, because the expansion of the bounding box for phrases in the filled form is based on text matching between phrases in the empty and filled forms, it is possible that the bounding box for some irrelevant phrases in the filled forms may be expanded. For example, if the filled form contains another segmented phrase "Services" elsewhere in the form, its bounding boxes will be expanded. This may result in spurious phrases being included in some vertical sequences in step S16. However, as will be seen below, in the matching step, such spurious phrases will not likely result in best matching sequences and therefore will not affect the overall result.

Step S18: After the phrases in the empty and filled forms are matched with each other, the rest of the text in the filled form (i.e. text that does not match any text in the empty form) is deemed user-filled data. Further, based on the settings file which stores the field names of the empty form, corresponding phrases in the filled form are designated as field names. Based on the positional relationship of each field name and its associated user input area as stored in the settings file, and the positional relationship between the user-filled data and text phrases in the filled form that have been matched to field names, the user-filled data are associated with the field names.

For example, in the illustrate example, the phrase "Invoice:" in the filled form is matched to the phrase "Invoice:" in the empty form, and the settings file indicates that the phrase "Invoice:" in the empty form is a field that has an associated user input area located to its right. Then, the phrase in the filled form that is located to the right of the phrase "Invoice:" will be determined to be user-filled data for the "Invoice:" field.

In an alternative embodiment, as a part of step S12, the operator may designate some text blocks of the empty form as non-form-field blocks, i.e., text that is not related to any form field that can accept user-filled data. The designations may be stored in the settings file. Correspondingly, when processing the filled form, the filled form is automatically compared to the empty form, by either image comparison or text comparison, to identify text blocks that match the non-form-field blocks of the empty form. These non-form-field blocks may then be excluded from both the empty and filled forms when generating the topological structures, which simplifies the topological structures and the subsequent matching. Alternatively, each non-form-field block may be treated as one text phrase for both the empty and filled forms when generating the topological structures, which again simplifies the topological structures.

To summarize, the floating form processing method described here utilizes topological structures forms, which is based on the horizontal and vertical neighborhood for each form field. The process uses a topological structure matching method that partially align the horizontal and vertical sequences between the empty and filled forms. The topological structure and matching method are independent of the positions of form fields in the images and the form can be completely floating.

The method has several benefits and advantages compared with other form processing methods. For example, unlike other approaches that are limited to structured documents, this method can process forms without aligning the empty and filled forms. The method does not require the number of lines in the table to be fixed, and users can fill any number of lines in the table and expand the table vertically. As long as the relative location of the fields are similar, the method does not require the positions of the fields to be fixed, which is a major constraint in many other form processing methods. The method uses the topological structures for the form fields which will be used for finding fields and user-filled data in the filled forms independent of the field locations and image position information.

In one aspect, the invention is a method carried out by a data processing system. In another aspect, the invention is computer program product embodied in computer usable non-transitory medium having a computer readable program code embedded therein for controlling a data processing apparatus to carry out the method. In another aspect, the invention is embodied in a data processing system.

It will be apparent to those skilled in the art that various modification and variations can be made in the floating form processing method and related apparatus of the present invention without departing from the spirit or scope of the invention. Thus, it is intended that the present invention cover modifications and variations that come within the scope of the appended claims and their equivalents.

What is claimed is:

1. A computer-implemented method for processing a document image, which is an image of a filled form that corresponds to an empty form, the empty form having a plurality of form fields in a floating structure, the method comprising:

obtaining a topological structure of the empty form, which includes, for each given text phrase among at least a subset of text phrases of the empty form, a vertical sequence containing text phrases in the empty form that have a vertically aligned relationship with the given text phrase, and a horizontal sequence containing text phrases in the empty form that have a horizontally aligned relationship with the given text phrase;

obtaining a settings file for the empty form, which specifies text phrases of the empty form that are field names of form fields of the empty form, and for each form field, a positional relationship between the field name and a corresponding user input area;

extracting and segmenting text phrases from the image of the filled form;

based on the extracted and segmented text phrases, generating a topological structure of the filled form, which includes, for each given text phrase among at least a subset of text phrases in the filled form, a vertical sequence containing text phrases in the filled form that have a vertically aligned relationship with the given text phrase, and a horizontal sequence containing text phrases in the filled form that have a horizontally aligned relationship with the given text phrase;

matching the text phrases in the empty form with segmented text phrases in the filled form by comparing the topological structure of the empty form with the topological structure of the filled form;

based on the matching of the text phrases, extracting text phrases in the filled form that do not match any text phrases in the empty form as user-filled data; and associating each text phrases of the user-filled data of the filled form with a form field based on the settings file and positional relationship of the text phrase of user-filled data with text phrases in the filled form that match field names in the empty form.

2. The method of claim 1, wherein the step of obtaining a topological structure of the empty form includes obtaining the topological structure of the empty form from a database, and the step of obtaining the settings file for the empty form includes obtaining the settings file from the database.

3. The method of claim 1, wherein the step of obtaining a topological structure of the empty form includes:
obtaining an image of the empty form;
extracting and segmenting text phrases from the image of the empty form; and
based on the extracted and segmented text phrases, generating the topological structure of the empty form.

4. The method of claim 3, wherein the step of obtaining the settings file for the empty form includes:
using a graphical user interface to display the extracted and segmented text of the empty form;
receiving, via the graphical user interface, inputs which specifies text phrases of the empty form that are field names of form fields of the empty form, and for each form field, a positional relationship between the field name and a corresponding user input area; and
generating the settings file based on the received inputs.

5. The method of claim 1, wherein each text phrase in the empty form and each text phrase in the filled form is a set of one or more text words that are located on a same line and having spaces between text words that are less than a predetermined threshold.

6. The method of claim 1, wherein the subset of text phrases in the empty form includes all text phrases in the empty form and the subset of text phrases in the filled form includes all text phrases in the filled form.

7. The method of claim 1, wherein in the topological structure of the empty form and the topological structure of the filled form, a vertically aligned relationship includes, for two text phrases, their respective vertical projections onto a horizontal axis either overlap each other by equal to or more than a first predefined threshold, or are separated from each other by less than a second predefined threshold, and a horizontally aligned relationship includes, for two text phrases, their respective horizontally projections onto a vertical axis either overlap each other by equal to or more than a third predefined threshold, or are separated from each other by less than a fourth predefined threshold.

8. The method of claim 1, wherein the step of matching the text phrases in the empty form with segmented text phrases in the filled form includes:
for each given text phrase in the empty form:
comparing the vertical sequence containing the given text phrase in the empty form to all vertical sequences of the filled form using partial sequence alignment, to identify a best matching vertical sequence of the filled form;
comparing the horizontal sequence containing the given text phrase in the empty form to all horizontal sequences of the filled form using partial sequence alignment, to identify a best matching horizontal sequence of the filled form;
determining whether the best matching vertical sequence and the best matching horizontal sequence both contain a common text phrase in the filled form and the common text phrase has identical text as the given text phrase in the empty form; and
in response to an affirmative determination in the determining step, designating the common text phrase in the filled form as a matching text phrase for the given text phrase in the empty form.

9. The method of claim 8, further comprising, in response to a negative determination in the determining step:
identifying all text phrases in the filled form that have identical text as the given text phrase in the empty form;
for each identified text phrase in the filled form:
comparing a vertical sequence of the filled form containing the identified text phrase with the vertical sequence of the empty form containing the given text phrase of the empty form, to calculate a first number of matching elements between the two vertical sequences;
comparing a horizontal sequence of the filled form containing the identified text phrase with the horizontal sequence of the empty form containing the given text phrase of the empty form, to calculate a second number of matching elements between the two horizontal sequences;
calculating a combination score for the identified text phrase in the filled form, wherein the combination score represents the first and second numbers of matching elements relative to a total number of sequence elements in the two vertical sequences of the empty and filled forms and the two horizontal sequences of the empty and filled forms; and
designating one of the identified text phrase in the filled form that has a highest combination score as a matching text phrase for the given text phrase in the empty form.

10. The method of claim 1, wherein the settings file includes flags that flag a second subset of text phrases in the empty form as table fields, and parameters specifying a text phrases size extension for each flagged text phrase,
wherein the method further comprises, after the step of extracting and segment text phrases from the image of the filled form and before the step of generating a topological structure of the filled form:

identifying any text phrase of the filled form that has identical text as a flagged text phrase in the settings file, and expanding a text phrases size of the identified text phrase based on parameters in the settings file that specify the text phrases size extension for the corresponding flagged text phrase.

11. A computer program product comprising a non-transitory computer readable storage medium having a computer readable program code embedded therein for controlling a data processing apparatus, the computer readable program code configured to cause the data processing apparatus to execute a process for processing a document image, which is an image of a filled form that corresponds to an empty form, the empty form having a plurality of form fields in a floating structure, the process comprising:

obtaining a topological structure of the empty form, which includes, for each given text phrase among at least a subset of text phrases of the empty form, a vertical sequence containing text phrases in the empty form that have a vertically aligned relationship with the given text phrase, and a horizontal sequence containing text phrases in the empty form that have a horizontally aligned relationship with the given text phrase;

obtaining a settings file for the empty form, which specifies text phrases of the empty form that are field names of form fields of the empty form, and for each form field, a positional relationship between the field name and a corresponding user input area;

extracting and segmenting text phrases from the image of the filled form;

based on the extracted and segmented text phrases, generating a topological structure of the filled form, which includes, for each given text phrase among at least a subset of text phrases in the filled form, a vertical sequence containing text phrases in the filled form that have a vertically aligned relationship with the given text phrase, and a horizontal sequence containing text phrases in the filled form that have a horizontally aligned relationship with the given text phrase;

matching the text phrases in the empty form with segmented text phrases in the filled form by comparing the topological structure of the empty form with the topological structure of the filled form;

based on the matching of the text phrases, extracting text phrases in the filled form that do not match any text phrases in the empty form as user-filled data; and associating each text phrases of the user-filled data of the filled form with a form field based on the settings file and positional relationship of the text phrase of user-filled data with text phrases in the filled form that match field names in the empty form.

12. The computer program product of claim 11, wherein the step of obtaining a topological structure of the empty form includes obtaining the topological structure of the empty form from a database, and the step of obtaining the settings file for the empty form includes obtaining the settings file from the database.

13. The computer program product of claim 11, wherein the step of obtaining a topological structure of the empty form includes:

obtaining an image of the empty form;

extracting and segmenting text phrases from the image of the empty form; and based on the extracted and segmented text phrases, generating the topological structure of the empty form.

14. The computer program product of claim 13, wherein the step of obtaining the settings file for the empty form includes:

using a graphical user interface to display the extracted and segmented text of the empty form;

receiving, via the graphical user interface, inputs which specifies text phrases of the empty form that are field names of form fields of the empty form, and for each form field, a positional relationship between the field name and a corresponding user input area; and generating the settings file based on the received inputs.

15. The computer program product of claim 11, wherein each text phrase in the empty form and each text phrase in the filled form is a set of one or more text words that are located on a same line and having spaces between text words that are less than a predetermined threshold.

16. The computer program product of claim 11, wherein the subset of text phrases in the empty form includes all text phrases in the empty form and the subset of text phrases in the filled form includes all text phrases in the filled form.

17. The computer program product of claim 11, wherein in the topological structure of the empty form and the topological structure of the filled form, a vertically aligned relationship includes, for two text phrases, their respective vertical projections onto a horizontal axis either overlap each other by equal to or more than a first predefined threshold, or are separated from each other by less than a second predefined threshold, and a horizontally aligned relationship includes, for two text phrases, their respective horizontally projections onto a vertical axis either overlap each other by equal to or more than a third predefined threshold, or are separated from each other by less than a fourth predefined threshold.

18. The computer program product of claim 11, wherein the step of matching the text phrases in the empty form with segmented text phrases in the filled form includes:

for each given text phrase in the empty form:

comparing the vertical sequence containing the given text phrase in the empty form to all vertical sequences of the filled form using partial sequence alignment, to identify a best matching vertical sequence of the filled form;

comparing the horizontal sequence containing the given text phrase in the empty form to all horizontal sequences of the filled form using partial sequence alignment, to identify a best matching horizontal sequence of the filled form;

determining whether the best matching vertical sequence and the best matching horizontal sequence both contain a common text phrase in the filled form and the common text phrase has identical text as the given text phrase in the empty form; and in response to an affirmative determination in the determining step, designating the common text phrase in the filled form as a matching text phrase for the given text phrase in the empty form.

19. The computer program product of claim 18, wherein the process further comprise, in response to a negative determination in the determining step:

identifying all text phrases in the filled form that have identical text as the given text phrase in the empty form;

for each identified text phrase in the filled form:

comparing a vertical sequence of the filled form containing the identified text phrase with the vertical sequence of the empty form containing the given text phrase of the empty form, to calculate a first number of matching elements between the two vertical sequences;

comparing a horizontal sequence of the filled form containing the identified text phrase with the horizontal sequence of the empty form containing the given text phrase of the empty form, to calculate a second number of matching elements between the two horizontal sequences;

calculating a combination score for the identified text phrase in the filled form, wherein the combination score represents the first and second numbers of matching elements relative to a total number of sequence elements in the two vertical sequences of the empty and filled forms and the two horizontal sequences of the empty and filled forms; and designating one of the identified text phrase in the filled form that has a highest combination score as a matching text phrase for the given text phrase in the empty form.

20. The computer program product of claim 11, wherein the settings file includes flags that flag a second subset of text phrases in the empty form as table fields, and parameters specifying a text phrases size extension for each flagged text phrase, wherein the process further comprises, after the step of extracting and segment text phrases from the image of the filled form and before the step of generating a topological structure of the filled form:

identifying any text phrase of the filled form that has identical text as a flagged text phrase in the settings file, and expanding a text phrases size of the identified text phrase based on parameters in the settings file that specify the text phrases size extension for the corresponding flagged text phrase.

\* \* \* \* \*